(12) United States Patent
Zou et al.

(10) Patent No.: US 10,428,901 B2
(45) Date of Patent: Oct. 1, 2019

(54) PERMANENT MAGNET DC MOTOR

(71) Applicant: Zhongshan Broad-Ocean Motor Co., Ltd., Zhongshan (CN)

(72) Inventors: Guanghua Zou, Zhongshan (CN); Hui Hu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 113 days.

(21) Appl. No.: 15/862,619

(22) Filed: Jan. 4, 2018

(65) Prior Publication Data

US 2018/0223956 A1   Aug. 9, 2018

(30) Foreign Application Priority Data

Feb. 7, 2017 (CN) .................... 2017 2 0113574 U (51) Int. Cl.
| | |
|---|---|
| *F16H 1/28* | (2006.01) |
| *H02P 6/08* | (2016.01) |
| *H02P 6/28* | (2016.01) |
| *H02K 7/116* | (2006.01) |
| *H02K 7/118* | (2006.01) |
| *H02K 11/215* | (2016.01) |
| *H02P 6/16* | (2016.01) |
| *H02K 5/22* | (2006.01) |
| *F16H 1/16* | (2006.01) |

(52) U.S. Cl.
CPC .............. *F16H 1/28* (2013.01); *H02K 7/116* (2013.01); *H02K 7/1185* (2013.01); *H02K 11/215* (2016.01); *H02P 6/08* (2013.01); *H02P 6/16* (2013.01); *H02P 6/28* (2016.02); *F16H 1/16* (2013.01); *H02K 5/225* (2013.01)

(58) Field of Classification Search
CPC ....... G01B 7/003; G01D 5/2013; G01P 3/443; G01P 3/44; G01P 13/04; B62D 15/021
USPC ................................ 324/207.25, 207.11, 693
See application file for complete search history.

(56) References Cited

U.S. PATENT DOCUMENTS

| | | | | |
|---|---|---|---|---|
| 5,511,320 A | * | 4/1996 | Heidel ..................... | G01C 9/06 33/366.13 |
| 5,547,383 A | * | 8/1996 | Yamaguchi ............. | A63F 13/06 434/62 |
| 2008/0309324 A1 | * | 12/2008 | Stuve ..................... | G01R 33/07 324/207.2 |

* cited by examiner

*Primary Examiner* — Giovanni Astacio-Oquendo
(74) *Attorney, Agent, or Firm* — Matthias Scholl P.C.; Matthias Scholl (57) ABSTRACT

A permanent magnet DC (PMDC) motor, including: a motor body including a revolving shaft; a Hall sensing module; a gear reducer; and a gear assembly including an output shaft; and a magnet ring. The gear assembly is disposed in the gear reducer. The gear assembly is connected to and driven by the revolving shaft of the motor body. The magnet ring is disposed on the revolving shaft or on the output shaft of the gear assembly. The Hall sensing module is disposed on the gear reducer. The Hall sensing module is adapted to sense a signal of the magnet ring to detect the revolving speed of the revolving shaft or the output shaft, and transmit detected data with regard to the revolving speed.

19 Claims, 9 Drawing Sheets

PERMANENT MAGNET DC MOTOR

CROSS-REFERENCE TO RELATED APPLICATIONS

Pursuant to 35 U.S.C. § 119 and the Paris Convention Treaty, this application claims foreign priority benefits to Chinese Patent Application No. 201720113574.9 filed Feb. 7, 2017, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The disclosure relates to a permanent magnet DC (PMDC) motor.

Description of the Related Art

Conventional motors include a gear reducer and a motor body including a revolving shaft. The gear reducer sleeves the revolving shaft of the motor body. The revolving shaft of the motor body is provided with a magnet ring, and a Hall sensing module is disposed in the motor body to sense the signal of the magnet ring and detect the revolving speed and direction of the motor. However, it is difficult to install the Hall sensing module in the motor body, and installation of the Hall sensing module in the motor body increases the labor and maintenance costs. In addition, the operation of the Hall sensing module is affected by the internal magnet field of the motor body, leading to inaccuracies in the detection of the revolving speed and revolving direction of the motor.

SUMMARY OF THE INVENTION

In view of the above-described problems, it is one objective of the invention to provide a permanent magnet DC (PMDC) motor. The permanent magnet DC (PMDC) motor has an improved structure thus facilitating the installation of a Hall sensing module, and the operation of the Hall sensing module is unaffected by the internal magnet field of the motor body.

To achieve the above objectives, in accordance with one embodiment of the invention, there is provided a permanent magnet DC (PMDC) motor, comprising: a motor body comprising a revolving shaft; a Hall sensing module; a gear reducer; and a gear assembly comprising an output shaft, the gear assembly being disposed in the gear reducer; and a magnet ring. The gear assembly is connected to and driven by the revolving shaft of the motor body; the magnet ring is disposed on the revolving shaft or on the output shaft of the gear assembly; the Hall sensing module is disposed on the gear reducer; the Hall sensing module is adapted to sense a signal of the magnet ring to detect a revolving speed of the revolving shaft or the output shaft, and transmit detected data with regard to the revolving speed.

In a class of this embodiment, the Hall sensing module comprises a bottom box, a box cover and a Hall circuit board; a Hall sensor is disposed on the Hall circuit board to sensor the signal of the magnet ring; the bottom box comprises a chamber, and the Hall circuit board is disposed in the chamber; a bottom surface of the box cover protrudes towards the chamber to form a positioning block and a positioning post; the Hall circuit board further comprises a location hole corresponding to the positioning post; the positioning block presses on a top surface of the Hall circuit board, and the Hall circuit board is fixed in the chamber via the positioning block and the positioning post.

In a class of this embodiment, the positioning block and the Hall sensor are located on two sides of the Hall circuit board, respectively.

In a class of this embodiment, the box cover sinks towards the chamber to form a groove on a top surface of the box cover and a boss protruding from the bottom surface of the box cover; the boss is located in the chamber; a bottom wall of the groove is provided with a through hole; the Hall sensing module further comprises a connector socket and a wiring terminal; the wiring terminal is electrically connected to an external circuit, the connector socket comprises a binding post and is embedded in the groove, and the binding post of the connector socket passes through the through hole and is welded on the Hall circuit board.

In a class of this embodiment, the connector socket comprises a side wall and a fixture block protruding from the side wall; one side of the wiring terminal is provided with a hook corresponding to the fixture block; the groove of the box cover is provided with a step which divides the groove into a first groove and a second groove, and the first groove is lower than the second groove; the connector socket is located in the first groove, and the fixture block and the hook are located in the second groove.

In a class of this embodiment, the box cover comprises an upper edge and a first flange extending from the upper edge, and the first flange comprises a bottom surface and a locating slot disposed on the bottom surface; the bottom box comprises an upper edge and a second flange extending from the upper edge, and the second flange comprises a top surface and a convex edge protruding from the top surface; and the convex edge is embedded in the locating slot.

In a class of this embodiment, the gear reducer comprises a box body and a cover plate; the box body comprises a cavity; the revolving shaft extends into the cavity and the magnet ring is disposed on the revolving shaft; the gear assembly is disposed in the cavity; the cover plate comprises a mounting hole, and the Hall sensing module is disposed in the mounting hole.

In a class of this embodiment, the cover plate comprises a third fixing hole close to a mounting hole, and the second flange and the first flange respectively comprise a second fixing hole and a first fixing hole which correspond to the third fixing hole; the Hall sensing module is equipped with mounting screws, the mounting screws pass through the first fixing hole, the second fixing hole and the third fixing hole to fix the Hall sensing module on the cover plate.

In a class of this embodiment, the bottom surface of the first flange of the box cover comprises a snap joint, one end of the snap joint is bent away from the boss of the box cover to form a hook head; the second flange f the bottom box comprises a gap corresponding to the snap joint, and the hook head is clamped in an inner side of the cover plate.

In a class of this embodiment, the box body further comprises a bottom wall and an installation hole disposed on the bottom wall; the installation hole communicates with the cavity; the output shaft of the gear assembly is disposed in the installation hoe; one end of the output shaft extends out of the box body, and the one end of the output shaft comprises a plurality of circumferentially-disposed teeth which are spaced with one another.

Advantages of the permanent magnet DC (PMDC) motor of the disclosure are summarized as follows.

1. The Hall sensing module is disposed on the gear reducer, which is conducive to the installation, maintenance, and wiring of the Hall sensor assembly, and the interference of the magnetic field in the motor body on the Hall sensing module is eliminated.

2. The positioning block can position the Hall circuit board in the longitudinal direction. The positioning post cooperates with the location hole to position the Hall circuit board in the horizontal direction. Thus, the positioning structure is simplified and the Hall circuit board is accurately positioned.

3. The positioning block and the Hall sensor are located on two sides of the Hall circuit board, respectively. Such an arrangement enables the Hall sensor to tightly attach to the bottom wall of the bottom box, thus improving the sensing effect of the Hall sensor.

4. The boss of the box cover is located in the chamber of the bottom box, and the connector socket is embedded in the groove of the box cover. Such an arrangement facilitates the positioning of the connector socket, and further stabilizes the installation of the Hall sensing module.

5. The convex edge of the bottom box is embedded in the locating slot of the box cover. The cooperation of the convex edge and the locating slot improves the waterproof and dustproof effect of the Hall sensing module.

6. The Hall sensing module is fixed on the cover plate via the mounting screws, which facilitates the assembly and disassembly of the Hall sensing module.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a permanent magnet DC (PMDC) motor are described below.

As shown in FIGS. 1-9, a permanent magnet DC (PMDC) motor, comprises: a motor body 1 comprising a revolving shaft 11; a Hall sensing module 2; a gear reducer 3; and a gear assembly 4 comprising an output shaft 42, the gear assembly being disposed in the gear reducer 3; and a magnet ring 21. The gear assembly 4 is connected to and driven by the revolving shaft 11 of the motor body 1; the magnet ring 21 is disposed on the revolving shaft 11 or on the output shaft 42 of the gear assembly 4; the Hall sensing module 2 is disposed on the gear reducer 3; the Hall sensing module 2 is adapted to sense a signal of the magnet ring 21 to detect a revolving speed of the revolving shaft 11 or the output shaft 42, and transmit detected data with regard to the revolving speed.

The Hall sensing module 2 is disposed on the gear reducer 3, which is conducive to the installation, maintenance, and wiring of the Hall sensor assembly 2, and the interference of the magnetic field in the motor body 1 on the Hall sensing module 2 is eliminated.

Figure 8:
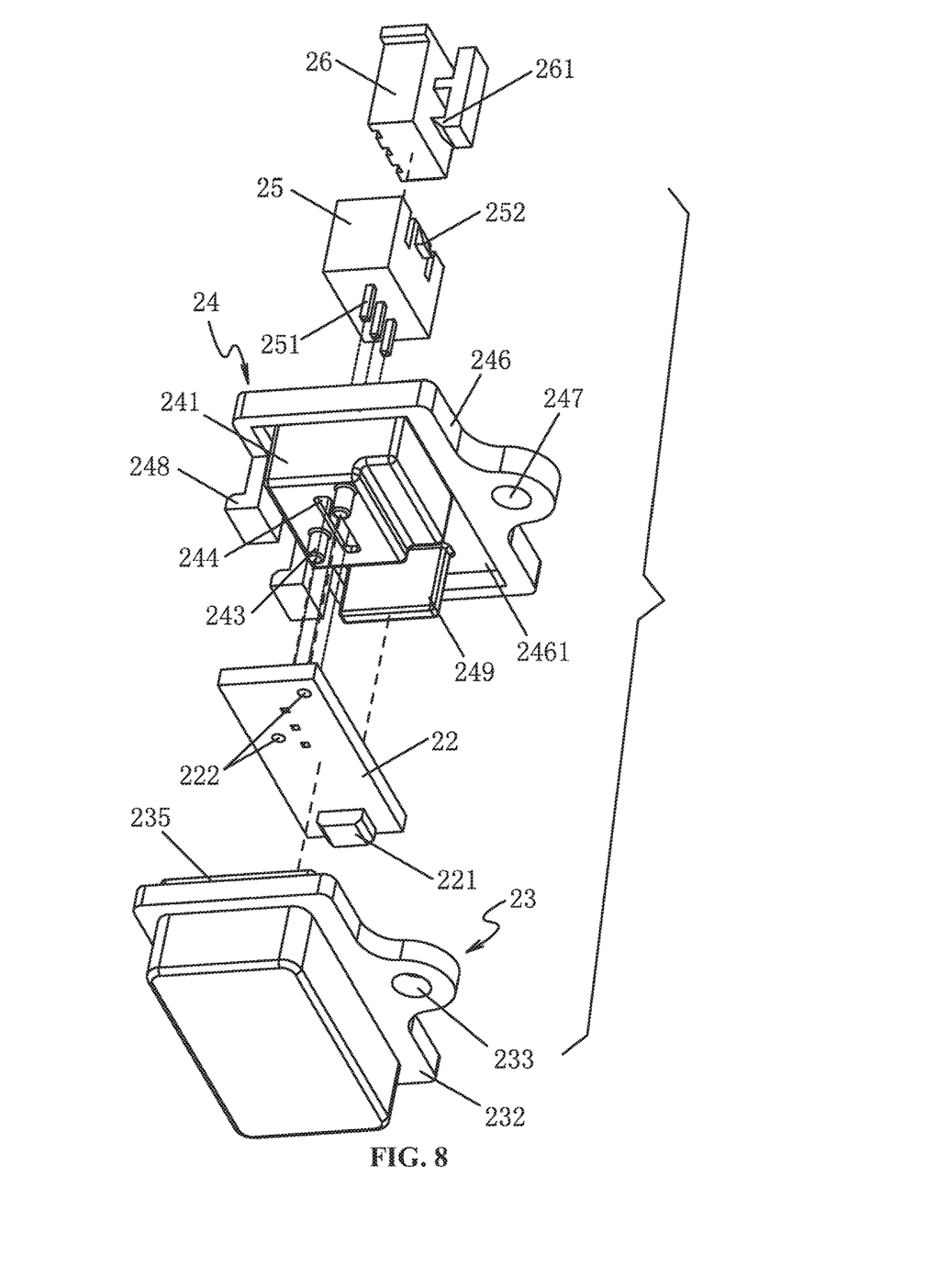
FIG. 8 is an exploded view of a Hall sensing module of a permanent magnet DC (PMDC) motor in accordance with one embodiment of the disclosure.
Figure 9:
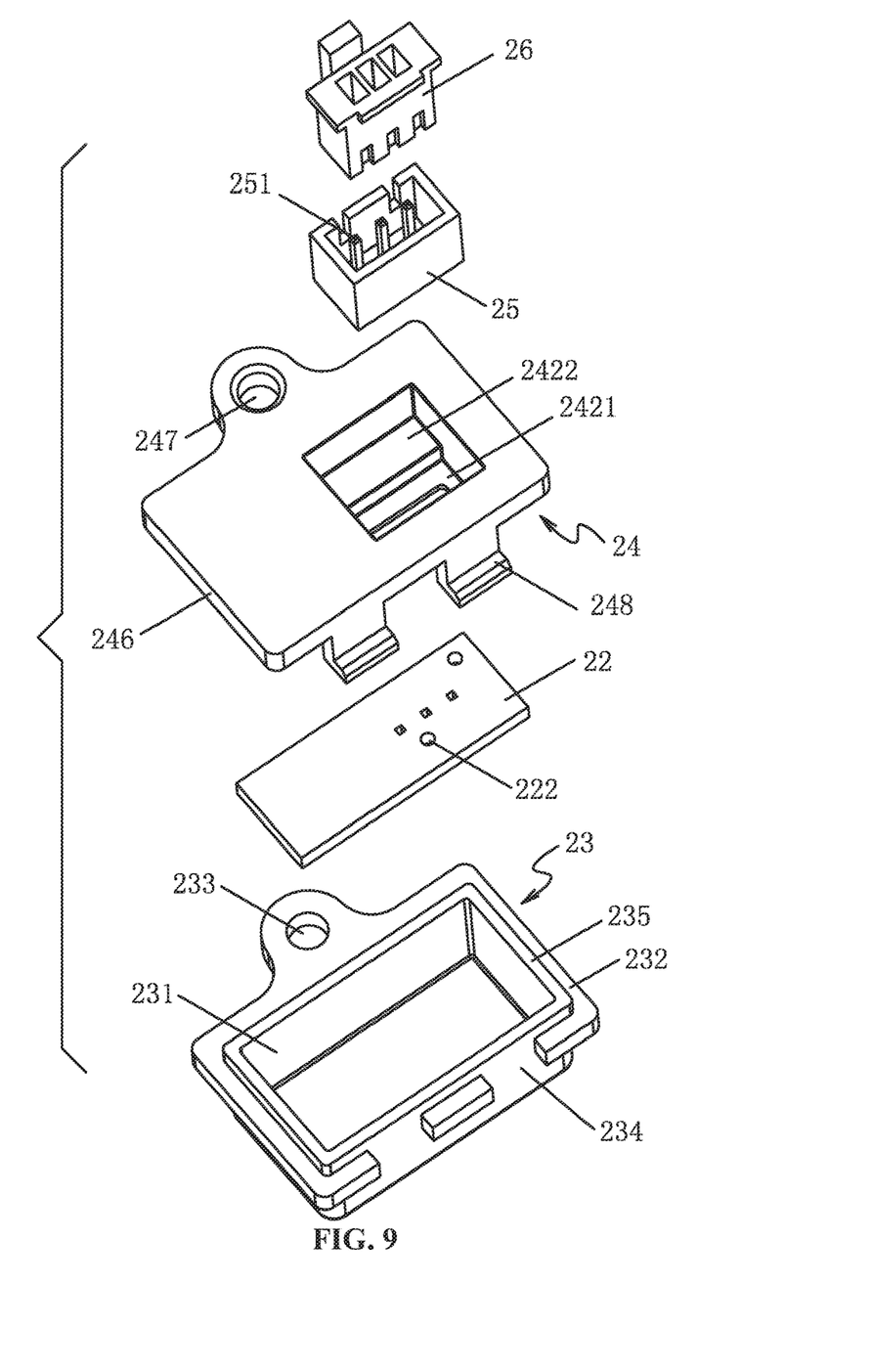
FIG. 9 is another exploded view of a Hall sensing module of a permanent magnet DC (PMDC) motor in accordance with one embodiment of the disclosure.

The Hall sensing module 2 comprises a bottom box 23, a box cover 24 and a Hall circuit board 22; a Hall sensor 221 is disposed on the Hall circuit board 22 to sensor the signal of the magnet ring 21; the bottom box 23 comprises a chamber 231, and the Hall circuit board 22 is disposed in the chamber 231; a bottom surface of the box cover 24 protrudes towards the chamber 231 to form a positioning block 249 and a positioning post 243; the Hall circuit board 22 further comprises a location hole 222 corresponding to the positioning post 243; the positioning block 249 presses on a top surface of the Hall circuit board 22, and the Hall circuit board 22 is fixed in the chamber 231 via the positioning block 249 and the positioning post 243. The positioning block 249 can position the Hall circuit board 22 in the longitudinal direction. The positioning post 243 cooperates with the location hole 222 to position the Hall circuit board 22 in the horizontal direction. Thus, the positioning structure is simplified and the Hall circuit board 22 is accurately positioned.

The positioning block 249 and the Hall sensor 221 are located on two sides of the Hall circuit board 22, respectively. Such an arrangement enables the Hall sensor 221 to tightly attach to the bottom wall of the bottom box 23, thus improving the sensing effect of the Hall sensor 221.

The box cover 24 sinks towards the chamber 231 to form a groove 242 on a top surface of the box cover 24 and a boss 241 protruding from the bottom surface of the box cover; the boss 241 is located in the chamber 231; a bottom wall of the groove is provided with a through hole 244; the Hall sensing module 2 further comprises a connector socket 25 and a wiring terminal 26; the wiring terminal 26 is electrically connected to an external circuit, the connector socket 25 comprises a binding post 251 and is embedded in the groove 242, and the binding post 251 of the connector socket 25 passes through the through hole 244 and is welded on the Hall circuit board 22. Such an arrangement facilitates the positioning of the connector socket 25, and further stabilizes the installation of the Hall sensing module 2.

The connector socket 25 comprises a side wall and a fixture block 252 protruding from the side wall; one side of the wiring terminal 26 is provided with a hook 261 corresponding to the fixture block 252; the groove 242 of the box cover 24 is provided with a step which divides the groove 242 into a first groove 2421 and a second groove 2422, and the first groove 2421 is lower than the second groove 2422; the connector socket 25 is located in the first groove 2421, and the fixture block 252 and the hook 261 are located in the second groove 2422.

The box cover 24 comprises an upper edge and a first flange 246 extending from the upper edge, and the first flange 246 comprises a bottom surface and a locating slot 2461 disposed on the bottom surface; the bottom box 23 comprises an upper edge and a second flange 232 extending from the upper edge, and the second flange 232 comprises a top surface and a convex edge 235 protruding from the top surface; and the convex edge 235 is embedded in the locating slot 2461. The cooperation of the convex edge 235 and the locating slot 2461 improves the waterproof and dustproof effect of the Hall sensing module 2.

Figure 1:
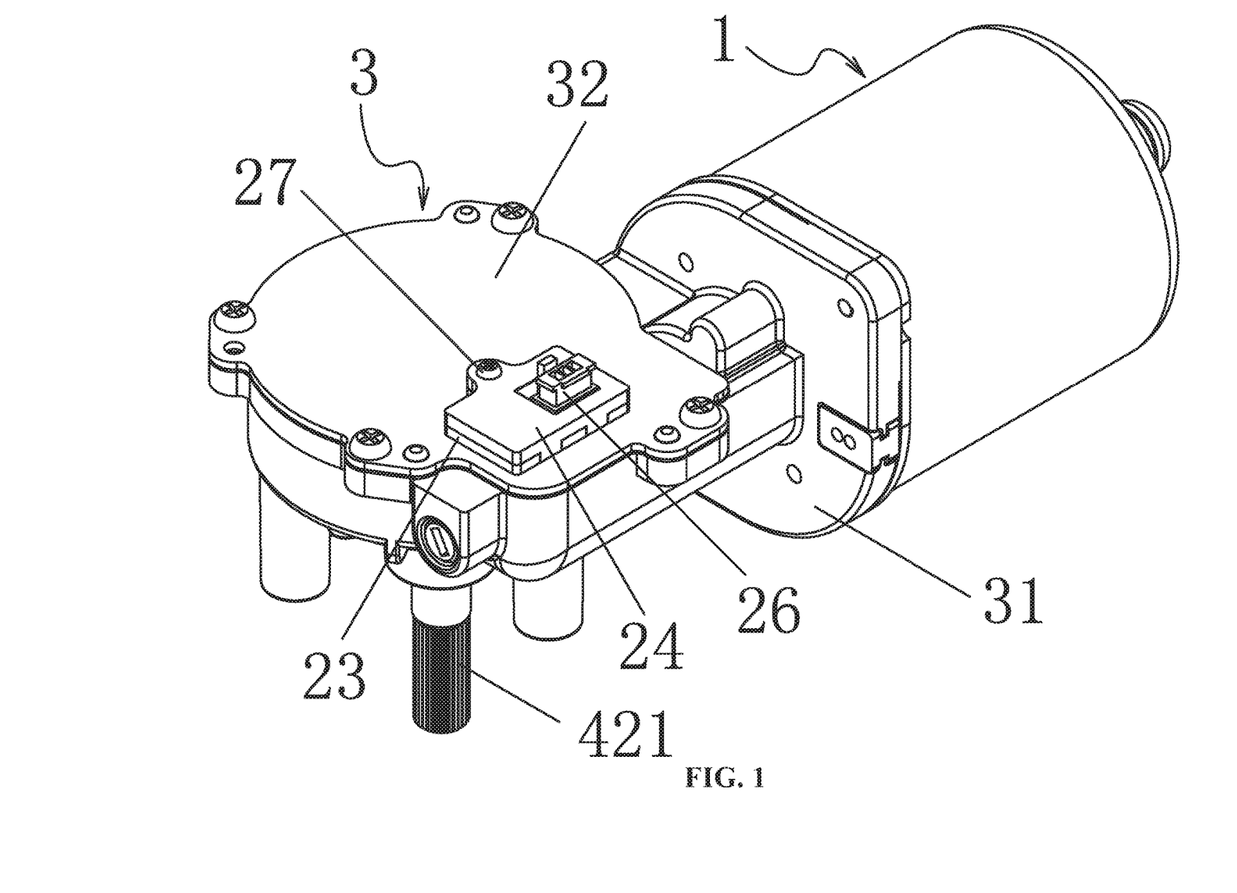
FIG. 1 is a stereogram of a permanent magnet DC (PMDC) motor in accordance with one embodiment of the disclosure.
Figure 2:
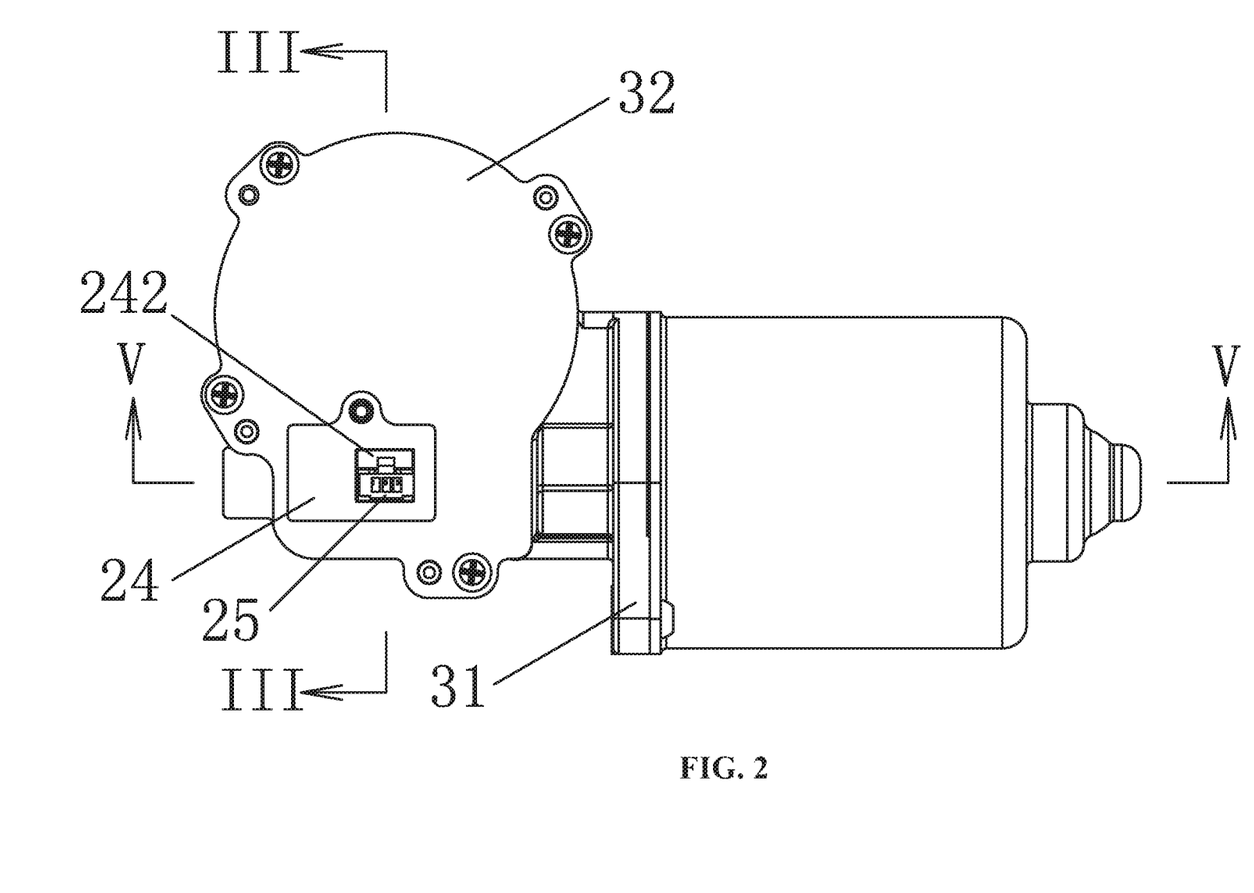
FIG. 2 is a front view of a permanent magnet DC (PMDC) motor in accordance with one embodiment of the disclosure.
Figure 3:
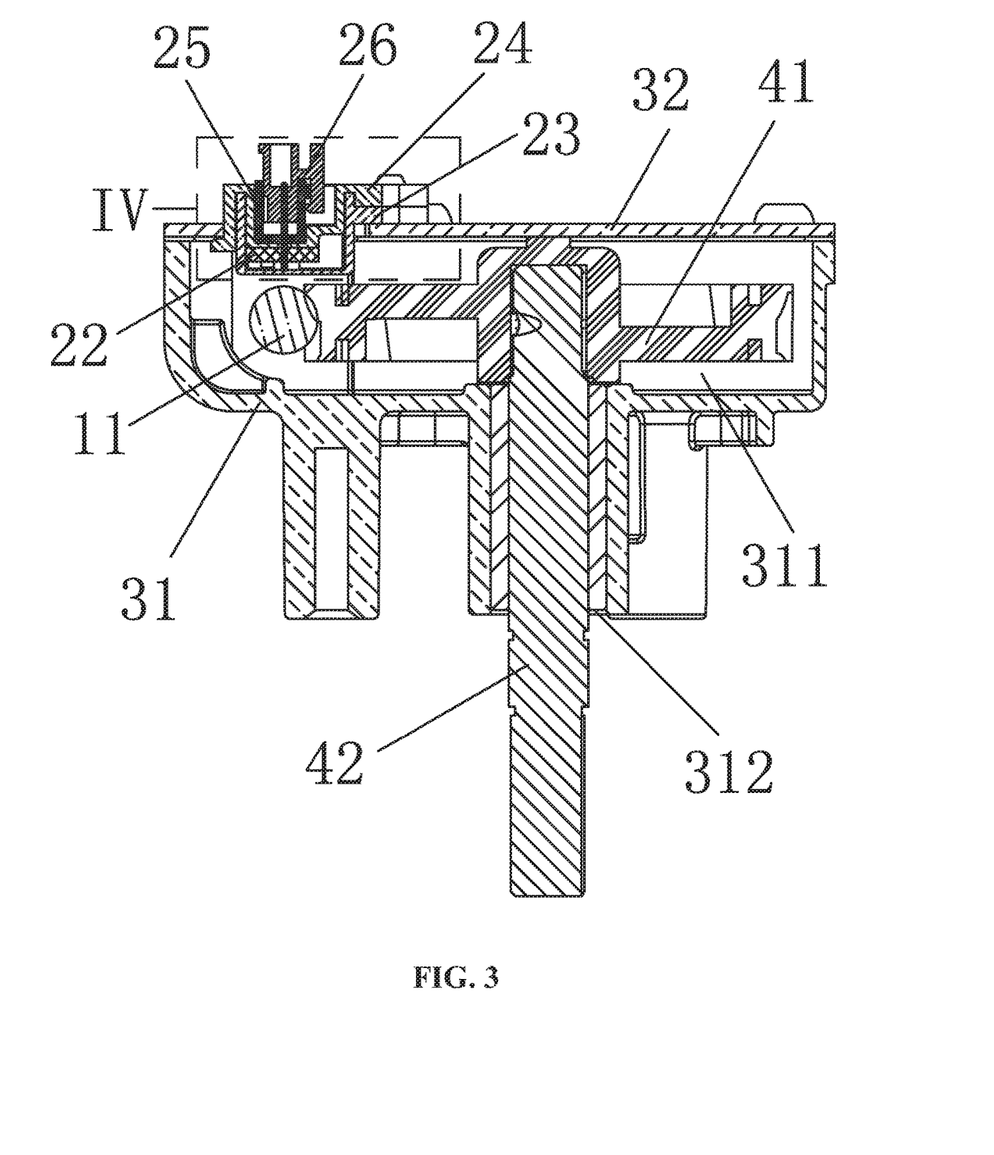
FIG. 3 is a sectional view taken from line III-III in FIG. 2.
Figure 4:
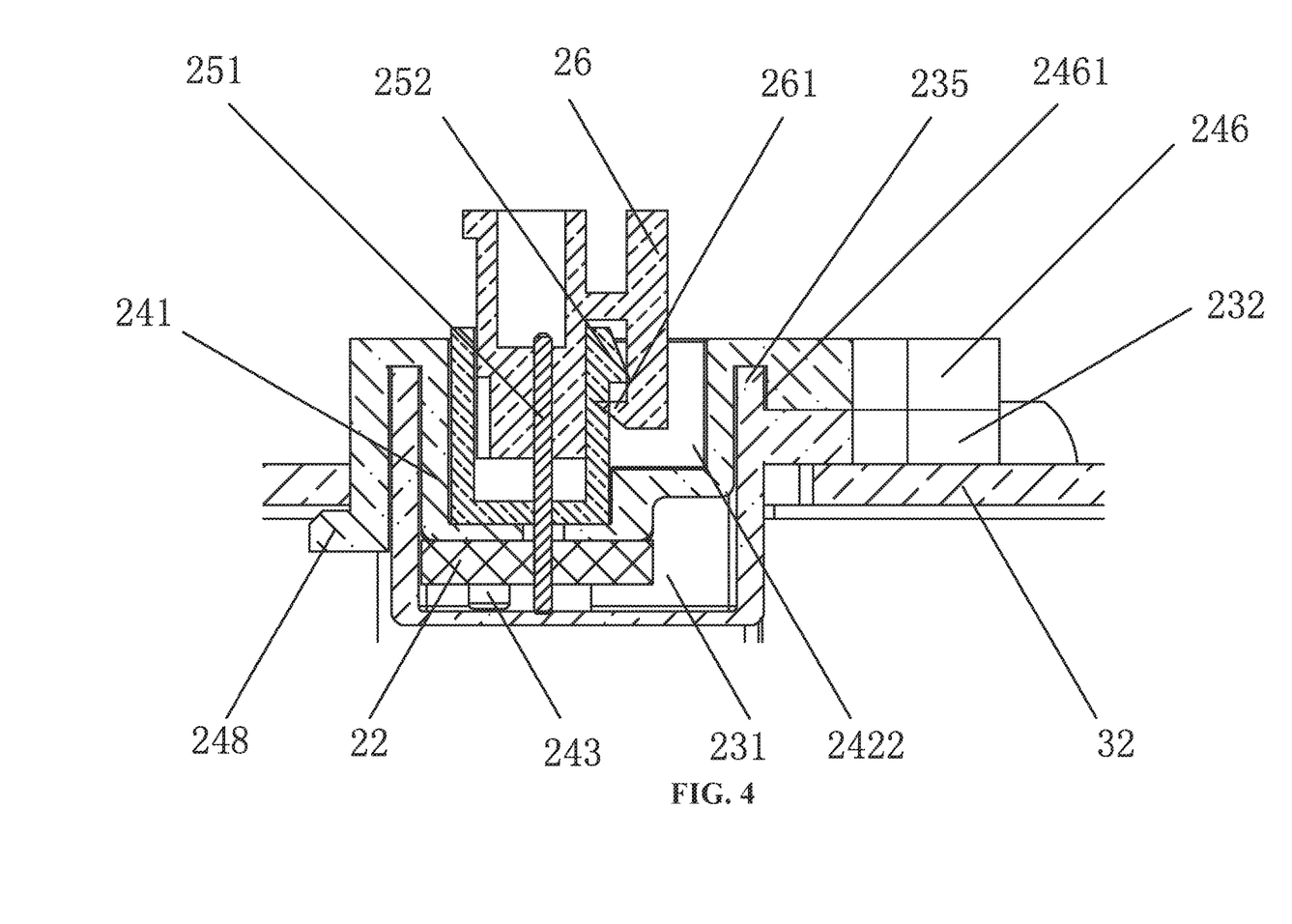
FIG. 4 is an enlarged view of part IV in FIG. 3.
Figure 5:
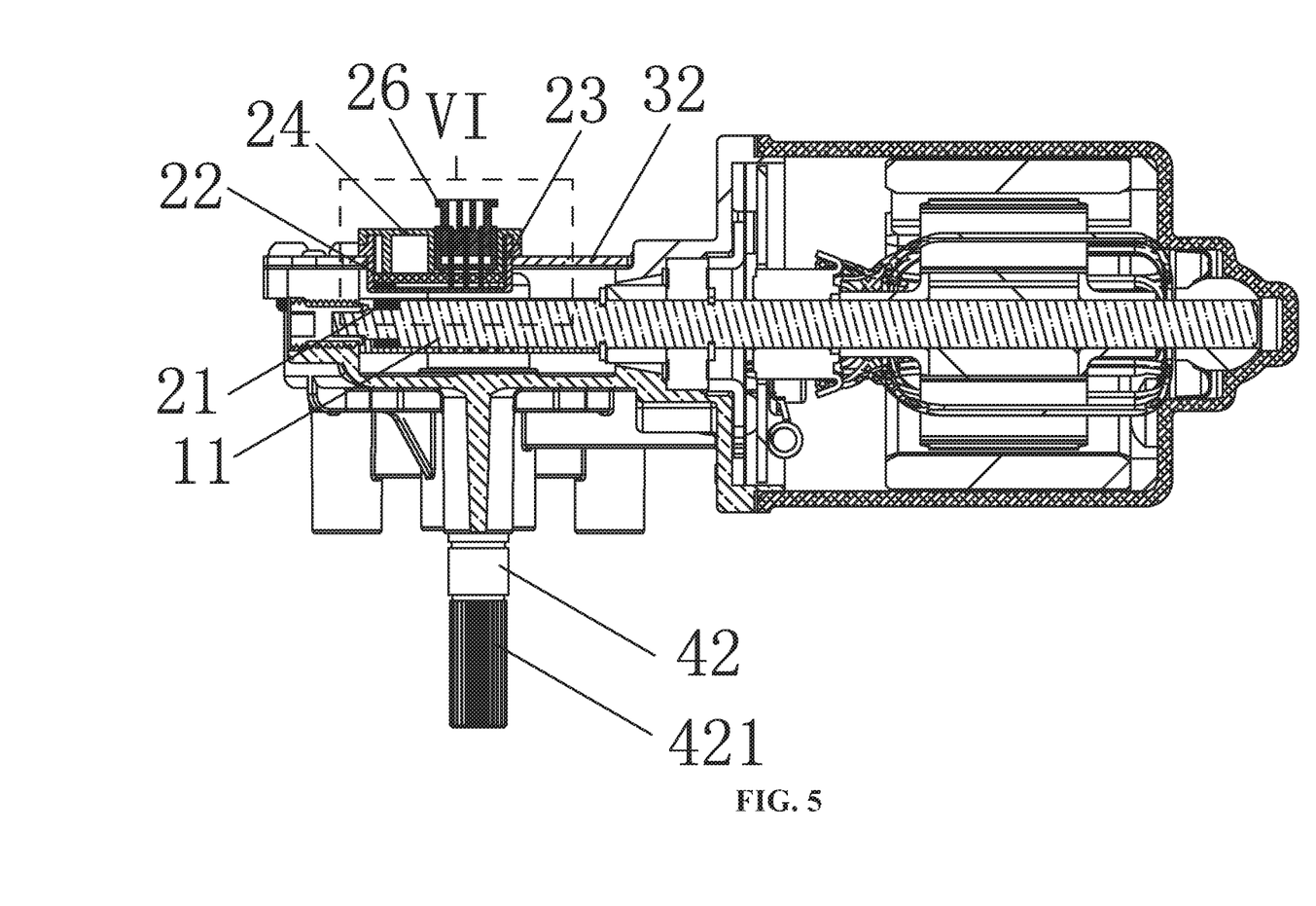
FIG. 5 is a sectional view taken from line V-V in FIG. 2.
Figure 6:
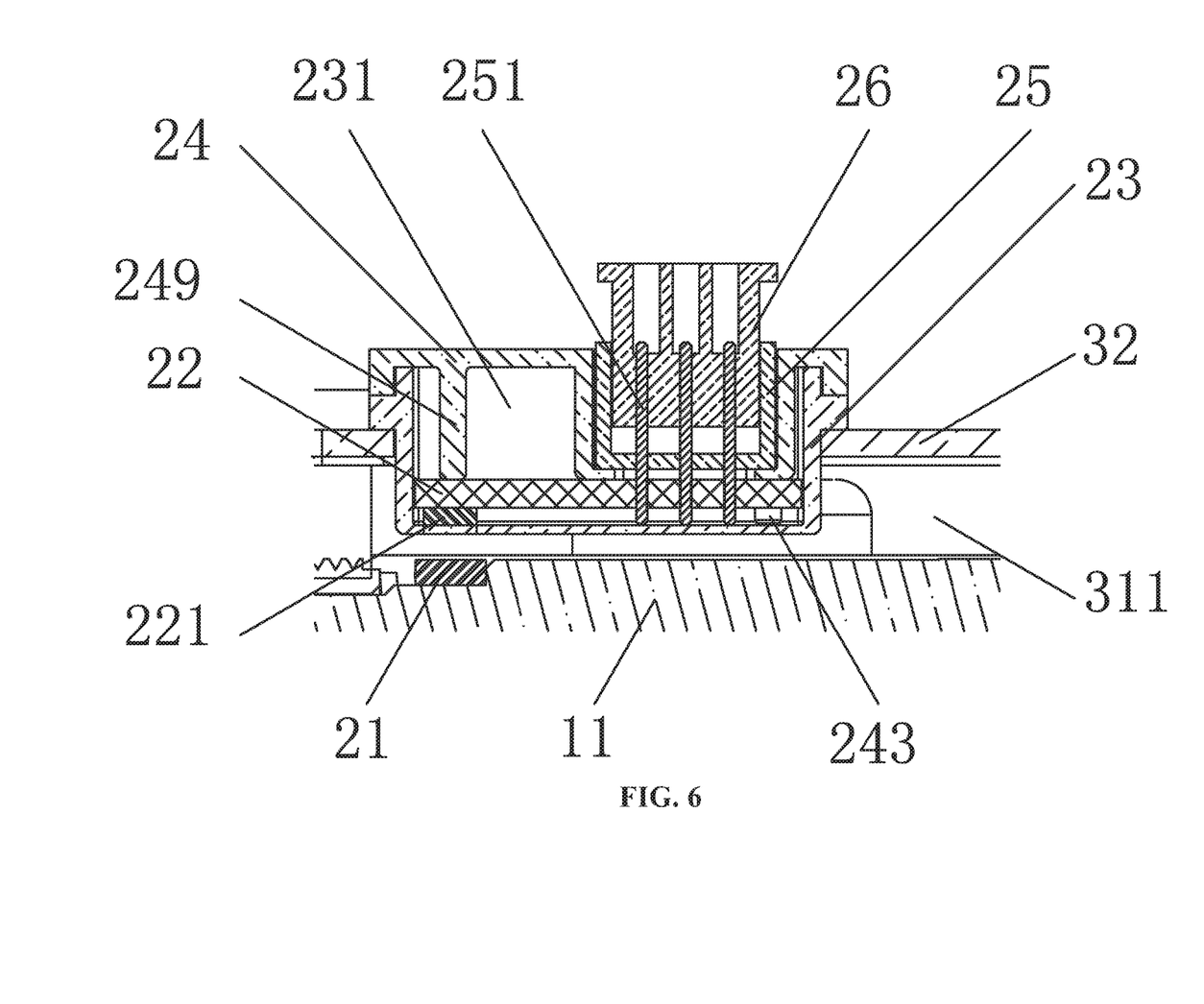
FIG. 6 is an enlarged view of part VI in FIG. 5.
Figure 7:
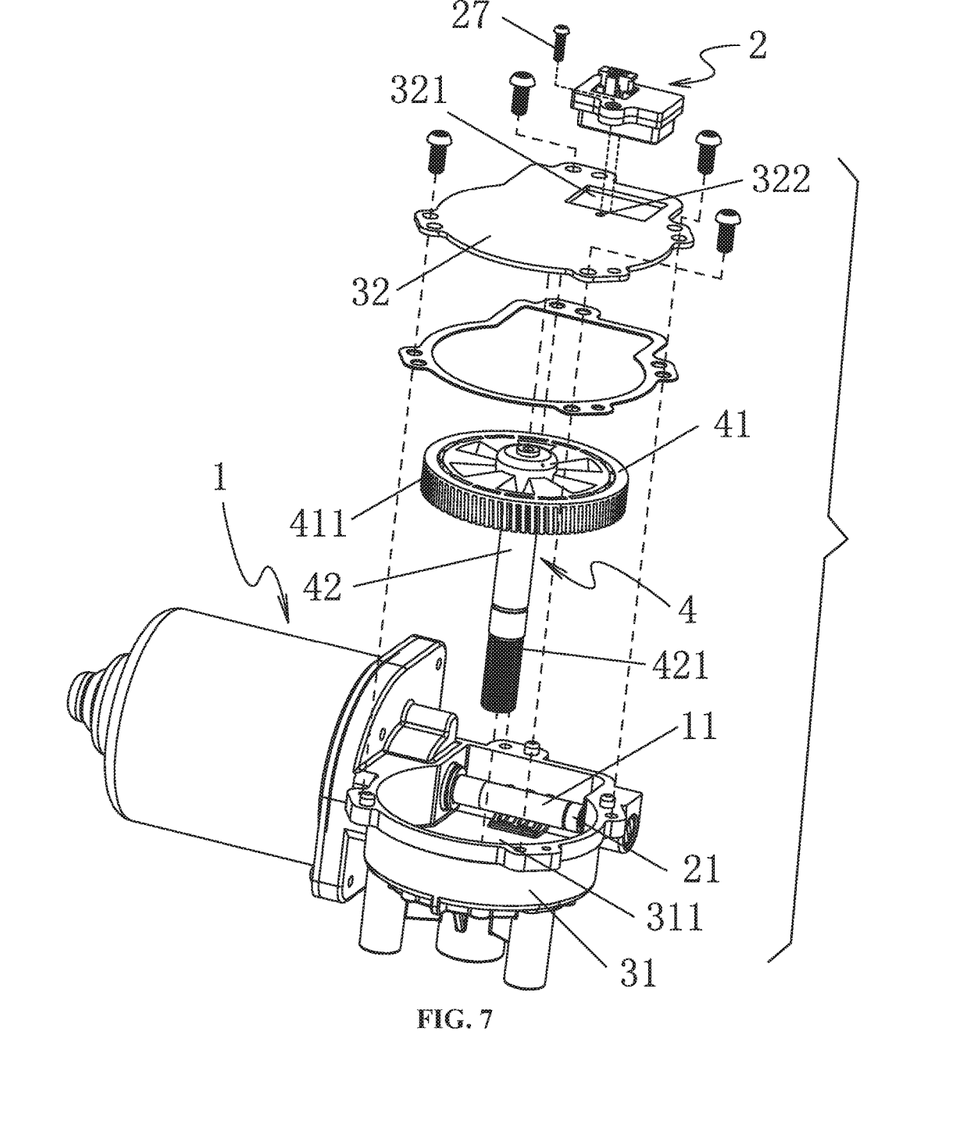
FIG. 7 is an exploded view of a permanent magnet DC (PMDC) motor in accordance with one embodiment of the disclosure.

The gear reducer 3 comprises a box body 31 and a cover plate 32; the box body 31 comprises a cavity 311; the revolving shaft 11 extends into the cavity 311 and the magnet ring 21 is disposed on the revolving shaft 11; the gear assembly 4 is disposed in the cavity 311; the cover plate 32 comprises a mounting hole 321, and the Hall sensing module 2 is disposed in the mounting hole 321.

The cover plate 32 comprises a third fixing hole 322 close to a mounting hole 321, and the second flange 232 and the first flange 246 respectively comprise a second fixing hole 233 and a first fixing hole 247 which correspond to the third fixing hole 322; the Hall sensing module 2 is equipped with mounting screws 27, the mounting screws 27 pass through the first fixing hole 247, the second fixing hole 233 and the third fixing hole 322 to fix the Hall sensing module 2 on the cover plate 32. The Hall sensing module 2 is fixed on the cover plate 32 via the mounting screws 27, which facilitates the assembly and disassembly of the Hall sensing module 2.

The bottom surface of the first flange 246 of the box cover 24 comprises a snap joint, one end of the snap joint is bent away from the boss 241 of the box cover 24 to form a hook head 248; the second flange 232 of the bottom box 23 comprises a gap 234 corresponding to the snap joint, and the hook head 248 is clamped in an inner side of the cover plate 32.

The box body 31 further comprises a bottom wall and an installation hole 312 disposed on the bottom wall; the installation hole 312 communicates with the cavity 311; the output shaft 42 of the gear assembly 4 is disposed in the installation hoe 312; one end of the output shaft 42 extends out of the box body 31, and the one end of the output shaft 42 comprises a plurality of circumferentially-disposed teeth 421 which are spaced with one another.

In this example, the magnet ring 21 can also be disposed on the output shaft 42, and the Hall sensing module 2 senses the revolving speed of the output shaft 42, and then transmits the detected data with regard to the revolving speed.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A permanent magnet DC (PMDC) motor, comprising:
a motor body comprising a revolving shaft;
a Hall sensing module;
a gear reducer; and
a gear assembly comprising an output shaft, the gear assembly being disposed in the gear reducer; and
a magnet ring;
wherein:
the gear assembly is connected to and driven by the revolving shaft of the motor body;
the magnet ring is disposed on the revolving shaft or on the output shaft of the gear assembly;
the Hall sensing module is disposed on the gear reducer; and
the Hall sensing module is adapted to sense a signal of the magnet ring to detect a revolving speed of the revolving shaft or the output shaft, and transmit detected data with regard to the revolving speed.

2. The motor of claim 1, wherein:
the Hall sensing module comprises a bottom box, a box cover and a Hall circuit board;
a Hall sensor is disposed on the Hall circuit board to sensor the signal of the magnet ring;
the bottom box comprises a chamber, and the Hall circuit board is disposed in the chamber; a bottom surface of the box cover protrudes towards the chamber to form a positioning block and a positioning post;
the Hall circuit board further comprises a location hole corresponding to the positioning post; and
the positioning block presses on a top surface of the Hall circuit board, and the Hall circuit board is fixed in the chamber via the positioning block and the positioning post.

3. The motor of claim 2, wherein the positioning block and the Hall sensor are located on two sides of the Hall circuit board, respectively.

4. The motor of claim 2, wherein:
the box cover sinks towards the chamber to form a groove on a top surface of the box cover and a boss protruding from the bottom surface of the box cover;
the boss is located in the chamber; a bottom wall of the groove is provided with a through hole;
the Hall sensing module further comprises a connector socket and a wiring terminal; and
the wiring terminal is electrically connected to an external circuit, the connector socket comprises a binding post and is embedded in the groove, and the binding post of the connector socket passes through the through hole and is welded on the Hall circuit board.

5. The motor of claim 4, wherein:
the connector socket comprises a side wall and a fixture block protruding from the side wall;
one side of the wiring terminal is provided with a hook corresponding to the fixture block;
the groove of the box cover is provided with a step which divides the groove into a first groove and a second groove, and the first groove is lower than the second groove; and
the connector socket is located in the first groove, and the fixture block and the hook are located in the second groove.

6. The motor of claim 5, wherein:
the box cover comprises an upper edge and a first flange extending from the upper edge, and the first flange comprises a bottom surface and a locating slot disposed on the bottom surface;
the bottom box comprises an upper edge and a second flange extending from the upper edge, and the second flange comprises a top surface and a convex edge protruding from the top surface; and
the convex edge is embedded in the locating slot.

7. The motor of claim 6, wherein the bottom surface of the first flange of the box cover comprises a snap joint, one end of the snap joint is bent away from the boss of the box cover to form a hook head; the second flange f the bottom box comprises a gap corresponding to the snap joint, and the hook head is clamped in an inner side of the cover plate.

8. The motor of claim 7, wherein the gear reducer comprises a box body and a cover plate; the box body comprises a cavity; the revolving shaft extends into the cavity and the magnet ring is disposed on the revolving shaft; the gear assembly is disposed in the cavity; the cover plate comprises a mounting hole, and the Hall sensing module is disposed in the mounting hole.

9. The motor of claim 8, wherein the cover plate comprises a third fixing hole close to a mounting hole, and the second flange and the first flange respectively comprise a second fixing hole and a first fixing hole which correspond to the third fixing hole; the Hall sensing module is equipped with mounting screws, the mounting screws pass through the first fixing hole, the second fixing hole and the third fixing hole to fix the Hall sensing module on the cover plate.

10. The motor of claim 8, wherein the box body further comprises a bottom wall and an installation hole disposed on the bottom wall; the installation hole communicates with the cavity; the output shaft of the gear assembly is disposed in the installation hoe; one end of the output shaft extends out of the box body, and the one end of the output shaft comprises a plurality of circumferentially-disposed teeth which are spaced with one another.

11. The motor of claim 6, wherein the gear reducer comprises a box body and a cover plate; the box body comprises a cavity; the revolving shaft extends into the cavity and the magnet ring is disposed on the revolving shaft; the gear assembly is disposed in the cavity; the cover plate comprises a mounting hole, and the Hall sensing module is disposed in the mounting hole.

12. The motor of claim 11, wherein the cover plate comprises a third fixing hole close to a mounting hole, and the second flange and the first flange respectively comprise a second fixing hole and a first fixing hole which correspond to the third fixing hole; the Hall sensing module is equipped with mounting screws, the mounting screws pass through the first fixing hole, the second fixing hole and the third fixing hole to fix the Hall sensing module on the cover plate.

13. The motor of claim 11, wherein the box body further comprises a bottom wall and an installation hole disposed on the bottom wall; the installation hole communicates with the cavity; the output shaft of the gear assembly is disposed in the installation hoe; one end of the output shaft extends out of the box body, and the one end of the output shaft comprises a plurality of circumferentially-disposed teeth which are spaced with one another.

14. The motor of claim 2, wherein the gear reducer comprises a box body and a cover plate; the box body comprises a cavity; the revolving shaft extends into the cavity and the magnet ring is disposed on the revolving shaft; the gear assembly is disposed in the cavity; the cover plate comprises a mounting hole, and the Hall sensing module is disposed in the mounting hole.

15. The motor of claim 14, wherein the cover plate comprises a third fixing hole close to a mounting hole, and the second flange and the first flange respectively comprise a second fixing hole and a first fixing hole which correspond to the third fixing hole; the Hall sensing module is equipped with mounting screws, the mounting screws pass through the first fixing hole, the second fixing hole and the third fixing hole to fix the Hall sensing module on the cover plate.

16. The motor of claim 14, wherein the box body further comprises a bottom wall and an installation hole disposed on the bottom wall; the installation hole communicates with the cavity; the output shaft of the gear assembly is disposed in the installation hoe; one end of the output shaft extends out of the box body, and the one end of the output shaft comprises a plurality of circumferentially-disposed teeth which are spaced with one another.

17. The motor of claim 1, wherein the gear reducer comprises a box body and a cover plate; the box body comprises a cavity; the revolving shaft extends into the cavity and the magnet ring is disposed on the revolving shaft; the gear assembly is disposed in the cavity; the cover plate comprises a mounting hole, and the Hall sensing module is disposed in the mounting hole.

18. The motor of claim 17, wherein the cover plate comprises a third fixing hole close to a mounting hole, and the second flange and the first flange respectively comprise a second fixing hole and a first fixing hole which correspond to the third fixing hole; the Hall sensing module is equipped with mounting screws, the mounting screws pass through the first fixing hole, the second fixing hole and the third fixing hole to fix the Hall sensing module on the cover plate.

19. The motor of claim 17, wherein the box body further comprises a bottom wall and an installation hole disposed on the bottom wall; the installation hole communicates with the cavity; the output shaft of the gear assembly is disposed in the installation hoe; one end of the output shaft extends out of the box body, and the one end of the output shaft comprises a plurality of circumferentially-disposed teeth which are spaced with one another.

* * * * *